Nov. 22, 1966    E. D. BICKFORD    3,287,586

PLANT GROWTH LAMP

Filed Oct. 1, 1963

ELWOOD D. BICKFORD
INVENTOR.

BY *Laurence Burns*

ATTORNEY

United States Patent Office 3,287,586
Patented Nov. 22, 1966

3,287,586
PLANT GROWTH LAMP
Elwood D. Bickford, Topsfield, Mass., assignor to Sylvania Electric Products Inc., a corporation of Delaware
Filed Oct. 1, 1963, Ser. No. 312,920
5 Claims. (Cl. 313—109)

This invention relates to electric lamps for providing radiation for the energy conversion processes, chlorophyl syntheses and photosynthesis of living plants, and to induce such maturation processes as stem elongation, flowering and fruiting of such plants.

One lamp for the irradiation of plants is described in copending United States patent application Serial No. 235,016, filed November 2, 1962, by Carl Bernier, and assigned to the same assignee as the present application. That lamp is exceptionally effective in assisting the germination of seeds and the rooting and growth of seedlings, and is very effective in the early stages of plant life. It is not, however, as useful in the latter or maturing processes of plant life, and commercial growers had great need of a lamp with which they could force such processes to bring the plants to maturity at the time of greatest market demand.

The so-called "Warm White" standard fluorescent lamp was sometimes tried for such purposes, and while somewhat better for the maturing process than other lamps was not sufficiently effective. A far better lamp was needed, and the present invention provides it.

It is found that the maturation processes of plants are controlled by a plant pigment called phytochrome, which appears to exist in two isomeric forms. One form absorbs red light of about 660 millimicrons in wavelength and triggers certain physiological responses and the other forms absorbs light at 730 millimicrons and triggers other physiological responses.

One form of phytochrome is converted to the other as indicated by the reaction $$P_{660} \rightleftarrows P_{730}$$

The lamp of my invention emits specific amounts of radiation at 730 millimicrons and at 660 millimicrons to influence the phytochrome responses as well as providing sufficient energy for the conversion processes in plants. Some of the radiation is in the 380–480 millimicron band of wavelengths to facilitate other aspects of plant growth.

This result is achieved in one embodiment of the invention by utilizing a low-pressure mercury-vapor fluorescent lamp with a phosphor coating of a particular combination of phosphors, for example, calcium tungstate and tin-activated strontium orthophosphate. These phosphors are sufficiently inexpensive so that the resulting lamp can be used commercially by plant growers. The lamp would be useless for practical purposes if the necessary phosphors were so expensive as to make the cost of the lamp too high for general commercial use. With the phosphors mentioned above, the lamp should be no more expansive than regular general lighting fluorescent lamps of the same size and wattage.

The lamp provides the necessary radiant energy for the energy conversion processes, chlorophyl synthesis and photosynthesis, which are pre-requisites to all forms of plant growth.

It also provides fixed amounts of radiation in the red (about 630 to 700 millimicrons wavelength) and far-red (about 700 to 780 millimicrons) regions of the spectrum for simultaneous irradiation, the proportions of radiations in these regions controlling the phytochrome reaction in such a manner as to cause the forcing of maturation processes, including stem elongation, flowering and fruiting of plants.

Other objects, advantages and features of the invention will be apparent from the following specification, taken in connection with the accompanying drawings, in which.

Figure 1:
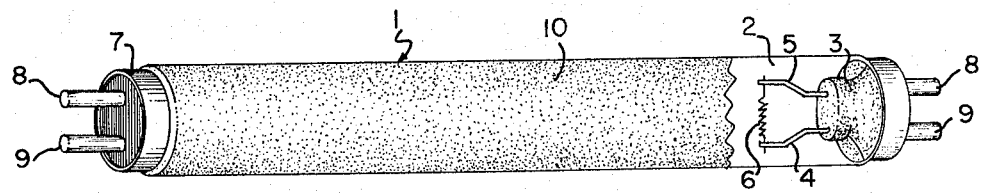
FIG. 1 is a profile view, partly in section, of one embodiment of a lamp according to my invention.
Figure 2:
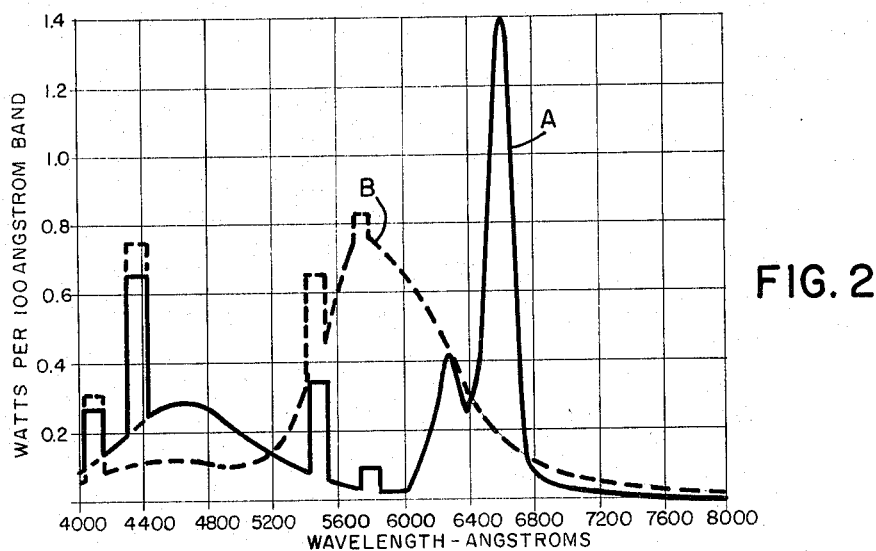
FIG. 2 is a graph of "Watts per 100 Angstrom Band" against "Wavelength in Angstroms" for an earlier plant irradiation lamp given by curve A, and a so-called "Warm White" fluorescent lamp, given by curve B, and which had sometimes been used for plant irradiation.

In FIG. 1, the lamp 1 has an elongated tubular glass envelope 2, which is sealed at each end by a glass stem 3, through which lead-in wires 4, 5 extend to support a filament 6 of coiled tungsten wire. The filament can be a doubly or triply-coiled filament of the usual type, or a suitable filament of some other type, and will carry the usual electron-emitting coating of alkaline earth oxide, generally containing also a small amount of zirconium dioxide as is now known in the art. The enevolpe contains a filling of inert gas at low pressure, for example, a pressure of about 2 mm. of mercury, and a small quantity of mercury, so that the lamp can be operated at a mercury vapor pressure of between 2 and 10 microns, for example. The usual base 7, from which the contact prongs 8, 9 extend in an insulated manner is cemented to each end of the lamp as is customary.

The lamp has a coating 10 of powdered phosphor, applied in the customary manner to the interior surface of the glass envelope. Although any suitable phosphors which will give the desired light emission can be used, I have found a mixture of about 78% by weight of tin-activated strontium orthophosphate and about 22% by weight of lead-intensified calcium tungstate to be very effective. The composition can vary from about 60% to about 90% of the strontium orthophosphate by weight, the remainder being calcium tungstate.

The orthophosphate component of the mixture can contain from about 0.001% to about 0.1% preferably 0.02% by weight of tin, at least part of that tin being in the stannous state, and for each two moles of the phospsate radical there can be, for example, about 2.55 moles of strontium, 0.30 mole of magnesium, and 0.08 moles of calcium. The proportions can be varied, or other phosphors used, so long as the ratio of near red to far red is within the desired range.

The calcium tungstate can be stoichiometric as to the calcium and tungstate radicals, or have up to 1 mole percent calcium in excess of stoichiometric, and can contain up to 0.5 mole of lead, preferably 0.0057 moles.

The phosphor mixture can be applied to the lamp tube 2 in the customary manner for fluorescent lamps.

Figure 3:
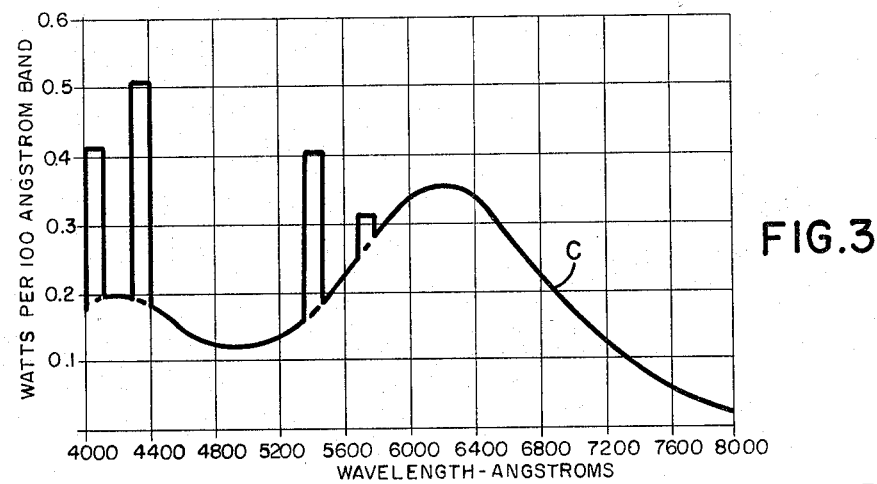
FIG. 3 is a similar graph of an embodiment of a lamp according to the invention, the curve of the graph being designated as "C."

Lamps according to my invention can be made in various sizes, but a convenient size is that of the usual 40-watt fluorescent lamp used in general lighting. When such a lamp is operated under the standard conditions for a 40-watt fluorescent lamp, the radiation emitted will be that shown in FIG. 3. The ratios between various visible bands of radiation will be as shown below, and the range over which these ratios can be varied for successful results on plants is also given.

Table 1

| Spectral Regions | Ratio | Ratio Range |
|---|---|---|
| 560–700 to 400–500 mm | 1.92 | 1.5 to 2.5 |
| 560–700 to 700–800 mm | 5.86 | 4.8 to 6.8 |
| 400–500 to 700–800 mm | 3.06 | 2.5 to 3.5 |
| 560–800 to 400–500 mm | 2.24 | 1.7 to 2.7 |

The difference between the energy emission of various 40-watt fluorescent lamps under standard electrical operating conditions at an ambient temperature of about 25° C. is as follows, including two prior lamps and the lamp of my invention.

Table II

| Lamp | Spectral Regions | | Ratio of Spectral Regions, 630–700/700–780 mm. |
|---|---|---|---|
| | 630–700 mm. | 700–780 mm. | |
| Warm White | 0.949 | 0.126 | 7.5 |
| Bernier | 2.864 | 0.058 | 49.4 |
| Invention | 1.859 | 0.691 | 2.7 |

As pointed out above, the lamp of application Serial No. 235,016, filed November 2, 1962, is best for germination and rooting and for the initial seedling stage of various plants, but not for bringing the plants to maturity. For the latter purpose, the best lamp previously used was the standard "Warm White" fluorescent, but it was only slightly helpful and not very satisfactory.

In Table II the "Bernier" lamp is that of U.S. patent application Serial No. 235,016, previously mentioned, and the "Invention" lamp is, of course, a lamp according to the invention. The ratio of radiation at 630 to 700 millimicrons wavelength to that at 700 to 780 millimicrons should be between about 1 to about 6 for best results.

When one group of plants were grown under "Warm White" fluorescent lamps and another group under lamps according to the specific example given of the invention (the species and age of the plants in each group, the humidity and room temperature, and the operating conditions of the lamps being the same), the plants grown under the lamps of the invention were greatly superior. They more than doubled the fruit set per plant, giving 114% greater results, and they gave 32% greater height growth per plant, 24% greater weight of fruit per plant, considerably earlier maturity, and greater resistance to virus infection.

The lamps were maintained approximately 12 inches above the growing apex of the plants. Among the plants irradiated were green beans and tomatoes of the variety "Contender" and "Waltham Forcing," respectively, although these are given merely as examples and good results are obtained with various other plants also.

In the above where the abbreviation mm., is used it represents millimicrons.

What I claim is:

1. A plant growth stimulating lamp comprising an elongated sealed tube of light-transmitting material, an electrode at each end thereof, a filling of inert gas at low pressure and a quantity of mercury therein, and on the interior surface of said envelope a fluorescent coating adapted, when excited by a discharge between said electrodes, to emit radiation having a spectral energy distribution such that the ratio of 560–700 millimicrons radiation to 400–500 millimicrons radiation is between about 1.5 to 2.5 and to 700–800 millimicrons radiation is between about 4.8 to 6.8, the ratio of 400–500 millimicrons radiation to 700–800 millimicrons radiation is between about 2.5 to 3.5, and the ratio of 560–800 millimicrons radiation to 400–500 millimicrons radiation is between about 1.7 to 2.7.

2. The lamp of claim 1, in which the coating is a mixture of calcium tungstate and strontium orthophosphate.

3. The lamp of claim 1, in which the coating is a mixture of about 22% calcium tungstate and about 78% strontium orthophosphate.

4. A plant growth stimulating lamp comprising an elongated sealed tube of light-transmitting material, an electrode at each end of said tube, a filling of inert gas and a quantity of mercury therein, and a coating of phosphor on the inside of said tube and having a ratio of its emitted radiation at between about 630 to 700 millimicrons wavelength to that at between about 700 to 780 millimicrons between about 1 and about 6, when excited by a discharge between the electrodes through the inert gas and mercury.

5. A plant growth stimulating lamp comprising an elongated sealed tube of light-transmitting material, an electrode at each end of said tube, a filling of inert gas and a quantity of mercury therein, and a coating of phosphor on the inside of said tube and having a ratio of its emitted radiation at between about 630 to 700 millimicrons wavelength to that at between about 700 to 780 millimicrons of about 2.7, when excited by a discharge between the electrodes through the inert gas and mercury.

References Cited by the Examiner

UNITED STATES PATENTS 2,178,436  10/1939  Ruttenauer _____ 313—109
2,919,365  12/1959  Butler et al. _____ 313—109

OTHER REFERENCES

Downs et al.: Photocontrol of Anthocyanin Synthesis in Milo Seedlings, Plant Physiology, vol. 38, No. 1, January 1963, pages 25 to 30.

Piringer et al.: Photocontrol of Growth and Flowering of Caryopteris, American Journal of Botany, vol. 50, No. 1, January 1963, pages 86 to 90.

Piringer et al.: Photocontrol of Growth and Flowering Rooting of Cuttings, Proceedings, Second Annual Meeting, Western Plant Propagators Conference, 1961 (4 pages).

Terrien et al.: Light, Vegetation, and Chlorophyll; New York, Philosophical Library, 1957, page 97 relied on.

DAVID J. GALVIN, *Primary Examiner.*

GEORGE N. WESTBY, *Examiner.*

D. E. SRAGOW, *Assistant Examiner.*